United States Patent [19]
Bialobrzewski

[11] Patent Number: 5,745,192
[45] Date of Patent: Apr. 28, 1998

[54] IR REMOTE CONTROL CODE TRANSLATOR FOR ENABLING CONTROL OF AN ELECTRONIC DEVICE WITH DIFFERENT FORMAT CONTROL CODES

[75] Inventor: Casimer Bialobrzewski, Niles, Ill.

[73] Assignee: Zenith Electronics Corporation, Glenview, Ill.

[21] Appl. No.: 531,575

[22] Filed: Sep. 18, 1995

[51] Int. Cl.$^6$ ................................................ H04N 5/44
[52] U.S. Cl. ................................. 348/734; 348/731
[58] Field of Search ........................ 348/734, 725, 348/731; 340/825.69, 875.72; H04N 5/44

[56] References Cited

U.S. PATENT DOCUMENTS 5,386,251  1/1995  Movshovich ............................ 348/734
5,436,676  7/1995  Pint et al. ............................... 348/734
5,477,275  12/1995 Toyoshima ............................. 348/734

Primary Examiner—Sherrie Hsia

[57] ABSTRACT

A remote control code translator integrated circuit converts input remote control codes of one format to output remote control codes of a different format for application to a microprocessor decoder in a television receiver. The arrangement enables a manufacturer to use common remote control codes for a number of products obtained from different OEM sources.

9 Claims, 1 Drawing Sheet

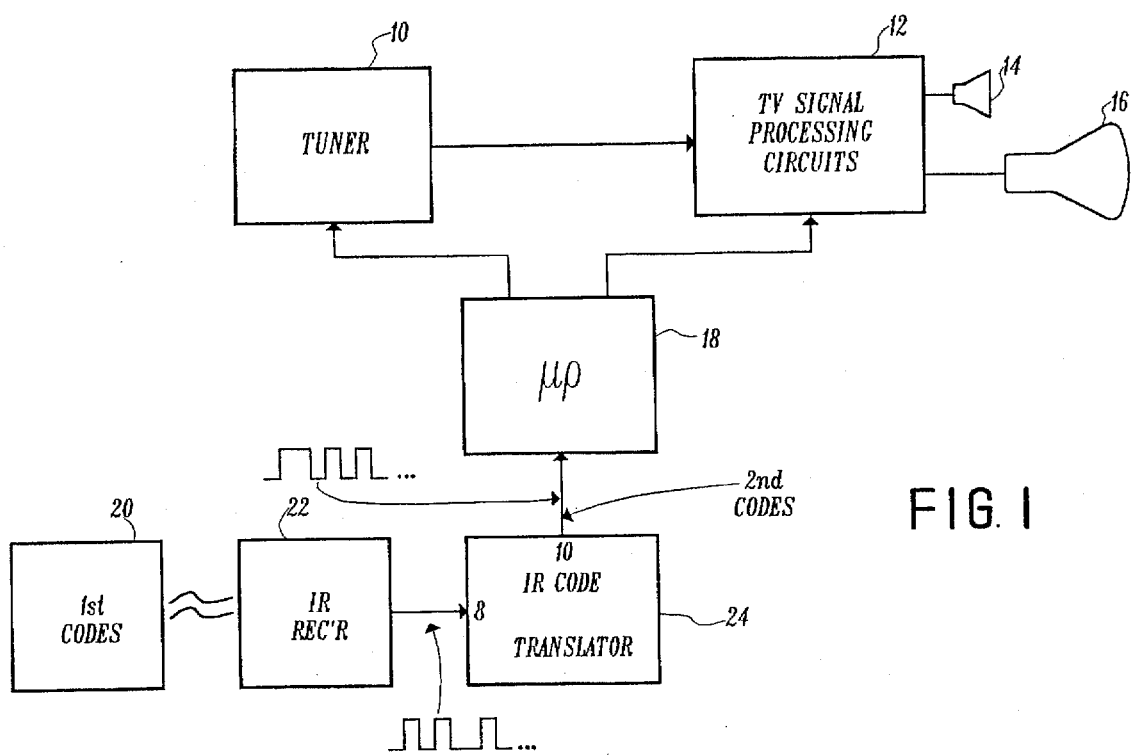
FIG. 1
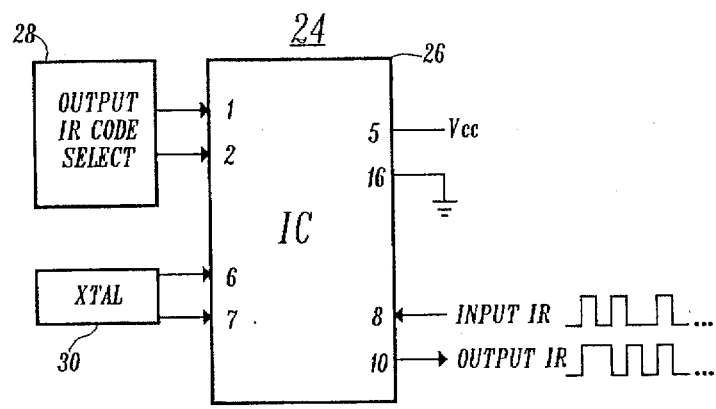
FIG. 2
| SELECT | PIN 1 | PIN 2 | OUTPUT CODE FORMAT |
|---|---|---|---|
| 1 | LOW | LOW | A |
| 2 | LOW | HIGH | B |
| 3 | HIGH | LOW | C |
| 4 | HIGH | HIGH | D |
FIG. 3

IR REMOTE CONTROL CODE TRANSLATOR FOR ENABLING CONTROL OF AN ELECTRONIC DEVICE WITH DIFFERENT FORMAT CONTROL CODES

BACKGROUND OF THE INVENTION AND PRIOR ART

This invention relates generally to remote control systems and particularly to remote control systems for television receivers, VCRs and the like. It is common for a manufacturer to purchase one or more products for sale under its brand name from a number of individual original equipment manufacturer (OEM) sources. Generally the individual sources also sell substantially identical products under their own brand names. Most modern electronic products are remotely controllable, that is they include a remote transmitter for transmitting infrared (IR) control signals to a receiving device for controlling various functions thereof. While common remote control codes may be used among the different product offerings of that manufacturer, the codes will differ from the control codes of other manufacturers. A problem arises when a customer purchases a brand name product that may not be manufactured by the brand manufacturer and discovers that the remote control transmitter cannot control other products of that manufacturer and vice versa, even though the products all bear the same brand name. The invention provides a relatively simple, low cost way to enable a manufacturer to sell products purchased from OEM's that utilize the brand manufacturers' remote control transmitters.

OBJECTS OF THE INVENTION

A principal object of the invention is to provide an improved remote control system.

Another object of the invention is to provide remote control compatibility among similarly branded products although the individual products may normally be responsive to a different remote control codes.

BRIEF DESCRIPTION OF THE DRAWINGS

These and other objects and advantages of the invention will be apparent upon reading the following description in conjunction with the drawings, in which:

FIG. 1 is a simplified block diagram showing the apparatus of the invention;

FIG. 2 is a block diagram of the transmitter of FIG. 1; and

FIG. 3 is a truth table for converting an input control code to one of a plurality of different output control codes.

DESCRIPTION OF THE PREFERRED EMBODIMENT

Referring to FIG. 1, a tuner 10 of conventional construction is coupled to a block 12 that indicates a television signal processing circuit. Block 12 in turn supplies a loudspeaker 14 and a cathode ray tube 16. It will be appreciated that the circuits of the simplified block diagram are all conventional and do not involve the invention. In accordance with well known practice, tuner 10 and block 12 are controlled by a microprocessor 18 for controlling the signal tuning and signal processing of the receiver. A remote control transmitter 20 supplies first remote control signals in a first format to an IR receiver 22 that is included in the television receiver. IR receiver 22 in turn is coupled to an IR code translator which translates the input first control codes into corresponding output second control codes for application to microprocessor 18. Microprocessor 18 is programmed to recognize the bit patterns of the second control codes of the OEM and consequently the first remote control codes from transmitter 20 are rendered usable by the receiver for controlling the various receiver functions.

The waveforms illustrated in FIG. 1 illustrate different control code bit patterns. The first control code for example, includes a "start bit" consisting of two closely spaced bits whereas the second control code include a start bit consisting of a long pulse. The individual functional portions of the control codes are different for each control function, it being understood that the IR code translator 24 is arranged to recognize the various control signals in the first code format and to convert them to similar control signals in the second control format.

In FIG. 2, translator 24 is indicated as being an integrated circuit chip (IC) 26 which includes an eight bit microprocessor with 8 K of ROM and 256 of RAM (not illustrated). The IC is available from Zilog under Part No. Z86C71. The pin numbers illustrated on IC 26 correspond to those on the actual product. An output select circuit 28 is coupled to pins 1 and 2 and, as will be discussed, is used to select which of a plurality of second control code outputs is desired in response to first control code inputs. A crystal 30 is coupled across pins 6 and 7, VCC is connected to pin 5, ground is connected to 16, pin 8 is the input for the first IR control codes and pin 10 represents the output of the corresponding second control codes in the selected different format.

In FIG. 3, a truth table is shown which indicates four different select conditions for output IR code selector 28. The combination of voltages on pins 1 and 2 of IC 26 determines the output code format, four of which A, B, C and D are illustrated with arbitrarily selected different output bit waveforms.

In operation, the first IR control codes transmitted by transmitter 20 and received by IR receiver 22 are converted to 5 volt peak to peak pulses. The translator 24 translates the number represented by the received first IR code to a corresponding number in a selected bit pattern corresponding to the second IR code. This second IR code is supplied to the microprocessor 18 which, in the usual way, decodes the second IR control codes. In most instances, a manufacturer who wishes to retain remote control commonality among its various products, including OEM products, will supply IC 26 to the OEM for insertion in the purchased product. (The manufacturer-purchaser will generally also supply the remote control transmitters for inclusion with the product.) In some instances, it may be necessary to modify the IR receiver 22 of the OEM to assure that the bandwidth is proper for receiving the first control codes. This is generally a minor tuning adjustment.

Thus, it is seen that with the invention, the OEM need only substitute the supplied IR code translator 24 in the OEM product. This preserves the commonality of the manufacturer's remote control codes and enables the customer to use the remote control transmitters (from other products from the manufacturer) with the newly purchased OEM-supplied product (and vice versa).

It is recognized that changes in the described embodiment of the invention will be apparent to those skilled in the art without departing from its true spirit and scope. The invention is to be limited only as defined in the claims.

What is claimed is:

1. A method of operating a remote control receiver comprising:

transmitting first control signals having a first format to a receiver in an electronic product having controllable functions;

translating the received first control signals into corresponding second control signals; and decoding the translated second control signals for controlling respective functions of the electronic product.

2. The method of claim 1 wherein the receiver includes a microprocessor responsive to the bit patterns of the second control signals for decoding the second control signals and wherein the translating comprises converting the bit patterns of the first control signals into the bit patterns of the second control signals.

3. The method of claim 2 further comprising providing translating means relating the bit patterns of the first control signals to a multiplicity of bit patterns corresponding to different format second control signals.

4. A method of operating a remote control receiver in an electronic product including a microprocessor for decoding second control signals having second bit patterns for controlling different functions of the electronic product comprising:

transmitting first control signals having first bit patterns to the receiver;

translating the received first control signal bit patterns to corresponding second control signal bit patterns; and decoding the translated second control signals for controlling the different functions of the electronic product.

5. A television receiver comprising:

IR means for receiving first IR control signals having a first format;

translating means for translating said received first IR control signals to corresponding second control signals having a different format for controlling various functions of said television receiver; and means in said television receiver for responding to said second control signals.

6. The receiver of claim 5 further including microprocessor means for decoding said second control signals received from said translating means.

7. The receiver of claim 6 wherein said translating means comprises an integrated circuit for translating the bit patterns of said first control signals into a plurality of different bit patterns corresponding to different second control signals; and means for selecting a desired one of said plurality of said different bit patterns.

8. A television receiver comprising:

IR means for receiving first IR control signals having first bit patterns;

translating means for translating said received first IR control signals to corresponding second control signals having different bit patterns for controlling various functions of said television receiver; and microprocessor means in said television receiver for decoding said second control signals.

9. The receiver of claim 8 wherein said translating means comprises an integrated circuit for translating said bit patterns of said first control signals into a plurality of different bit patterns corresponding to a plurality of different second control signals; and means for selecting a desired one of said plurality of said different second control signals.

\* \* \* \* \*